May 10, 1960  S. J. GRALEWICZ  2,936,148
BACKUP PLATE
Filed March 5, 1958

INVENTOR.
SIGMUND J. GRALEWICZ,
BY
ATTORNEY.

United States Patent Office 2,936,148
Patented May 10, 1960

2,936,148

BACKUP PLATE

Sigmund J. Gralewicz, Milwaukee, Wis.

Application March 5, 1958, Serial No. 719,275

9 Claims. (Cl. 248—308)

This invention relates to a backup plate or support for wire or rod forms of various shapes and for various purposes. It is a simple device which is cheaply mass produced and is suitable for a variety of support adaptations, several of which are disclosed in the accompanying specification and drawings.

A principal object of the invention is the provision of such a plate which may be made of suitable materials by punching, stamping or molding, which is light in weight and attractive in appearance and may be used with equal facility in the home, factory or store. The adaptations disclosed are merely illustrative in nature and are not to be construed as limiting the invention, which is clearly of general application.

Preferred embodiments are disclosed in the accompanying specification and drawings, in which.

Figure 1:
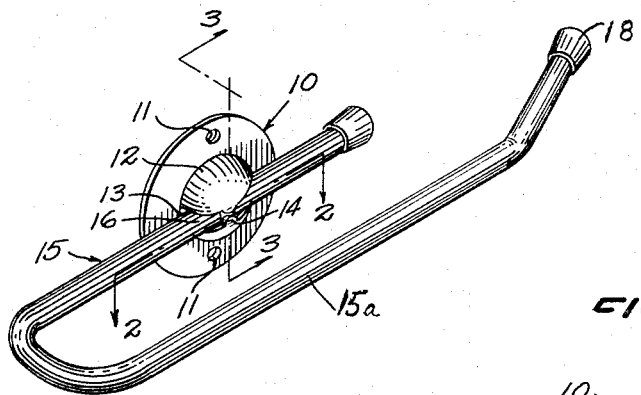
Figure 1 is a perspective view of one adaptation of the invention.

The invention comprises a backup plate having a base 10, in which suitably spaced holes 11 are formed for the reception of screws, nails or other fastening devices (not shown) by means of which the plate may be secured to a support. Substantially centrally of the plate, an arcuate or semicircular depression or dished portion 12 is formed. The dished portion is cut away centrally to form a slot 13, teats or projections 14 being simultaneously formed midway of the ends thereof, these teats being opposite one another and extending into the slot.

Figure 2:
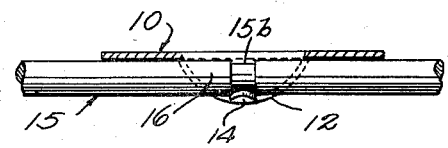
Figure 2 is a horizontal, sectional view thereof along the line 2—2 of Figure 1.
Figure 3:
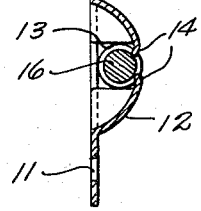
Figure 3 is a vertical, sectional view thereof along the line 3—3 of Figure 1.
Figure 4:
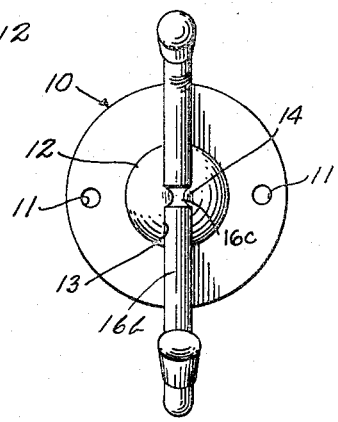
Figure 4 is a front elevation of another adaptation of the invention.
Figure 5:
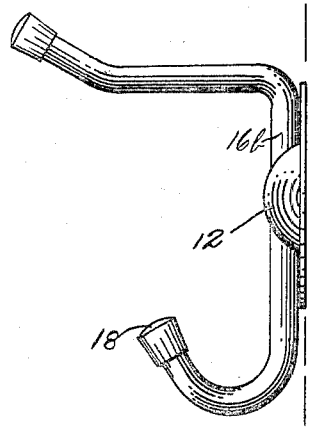
Figure 5 is a side elevation of the adaptation shown in Figure 4.
Figure 6:
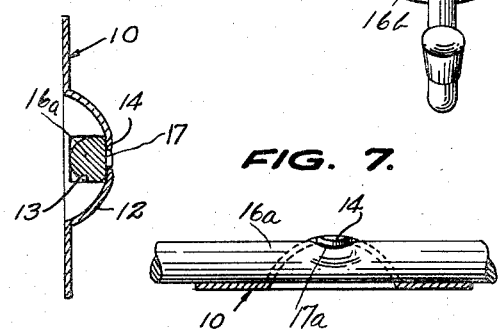
Figure 6 shows the backup plate applied to a modified form of rod.
Figure 7:
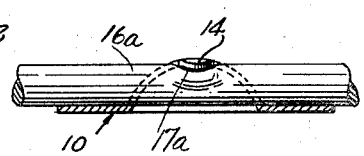
Figure 7 is a central horizontal, sectional view of the backup plate showing another adaptation.

A rod or wire member 15 which may be formed into a coat hanger, towel rack or other suitable device, has a portion 16 extending into the slot and projecting from each end thereof. As shown in Figure 3, the teats or projections 14 may be bent into frictional engagement with the periphery of the wire, or the wire may be formed with an indentation over a portion of its periphery as shown in Figures 6 and 7. The teats may be pressed into said indentation to retain the wire in the slot and to prevent endwise movement thereof with respect to the dished portion. Or, as shown in Figures 2, 3, 4, the wire may be formed with a peripheral groove 15b, 15c, the groove being aligned with the teats during assembly so that the teats may engage the groove. In this latter form of the invention, the wire or rod may be rotated with respect to the backup plate so that in the case of a coat hanger, for example, the hanger may be moved from side to side to lie substantially parallel to the backup plate, or it may be made to project outwardly thereof substantially at a right angle thereto, or at any other angle as convenience may dictate. In the case of a towel rack, toilet paper holder or paper towel roll holder, or the like, as shown in Figure 1, the rod portion 15a may be lifted, rotating the part 16 in the backup plate, to apply a roll or a cloth towel to the bar 15a, which may then drop under the weight of the added article, against the support to which the backup plate may be attached.

In the form shown in Figure 6, the rod portion 16a may be formed with a slightly flattened portion 17 where it engages the teats instead of being peripherally grooved as in Figures 2 and 3. Or, as shown in Figure 7, it may be formed with a slight indentation or depression 17a, into which the teats 14 may be pressed.

In assembly of the parts the free end of the rod 16 is passed endwise through the slot 13 of the backup plate until the grooved or indented or flattened portion thereof is brought into position behind the teats 14, which may then be pressed into engagement with those portions to prevent undesirable endwise movement of the rod with respect to the backup plate. As shown, the plate made for a coat hanger support is arranged with the slot in a vertical position, and for a towel bar or otherwise it may be arranged in a horizontal position. Obviously, it may be arranged at any angle between these positions to suit the need of any particular adaptation.

While the teats have been described and shown as pressed or bent into place with respect to the groove or indentation in the rod, this may be done where the rod is of substantially smaller diameter than the depth of the slot, but where the rod is of a diameter substantially equal to that of the depth of the slot, the teats will hold it in place without being bent.

Also, the device may be used without teats as it has been found that pressing down on the dimples on each side of the slot tends to bend the edges thereof forming the slot inwardly of the slot and to frictionally grip the rod therein.

The free ends of the wire may have tips 18 of metal, rubber, modern plastics or other material applied thereto in known fashion to finish off the cut ends of the wire to give the device an ornamental appearance.

Having thus described my invention, I claim:

1. A backup plate for wire formed products such as coat hangers, towel racks and the like, comprising a base, a dished portion formed in said base, and a slot formed in said dished portion a wire support member supported in said slot against longitudinal movement therein, said support member being rotatable about its longitudinal axis.

2. A backup plate according to claim 1, in which means are formed on said dished portion for retaining said wire in said slot.

3. A backup plate according to claim 1 in which means are formed on said dished portion for preventing endwise movement of said wire in said slot.

4. A backup plate according to claim 1 in which the edges of the dished portion forming the slot are pressed inwardly and are adapted to engage said wire frictionally.

5. A backup plate for wire formed products such as coat hangers, towel racks and the like, comprising a base, a dished portion formed in said base, a slot formed in said dished portion, a wire member passing through said slot and extending beyond each end thereof, the edges of the dished portion forming the slot forming a bearing surface for said wire member, said wire member being rotatable about its axis in said slot, and coacting means on said dished portion and wire for retaining said wire against endwise movement in said slot.

6. A backup plate according to claim 5 in which said coacting means comprises an indentation in said wire and a teat extending from said dished portion and engaging said indentation.

7. A backup plate according to claim 5, in which said coacting means comprises a peripheral groove in said wire and a projection on said dished portion extending into said slot and engaging said groove.

8. A backup plate according to claim 5, in which said coacting means comprises a peripheral groove in said wire and oppositely extending projections on said dished portion, said projections extending into said slot and being bent into said groove.

9. A backup plate for wire formed products such as coat hangers, towel bars and the like, comprising a base, a dished portion formed in said base, a slot formed in said dished portion, a wire member supported in said slot and extending beyond each end thereof, said wire having a peripheral groove thereon, each edge of the dished portion defining said slot having an oppositely extending projection extending into said slot on each side of said wire, said projections extending into said groove in said wire, the wire having a diameter substantially coinciding with the width and depth of said slot.

References Cited in the file of this patent

UNITED STATES PATENTS

| | | |
|---|---|---|
| 799,538 | Conover | Sept. 12, 1905 |
| 910,420 | Schlang | Jan. 19, 1909 |
| 1,848,937 | Coventry | Mar. 8, 1932 |
| 2,162,815 | Krueger | June 20, 1939 |
| 2,304,967 | Tiryakian | Dec. 15, 1942 |
| 2,659,928 | Eggerss | Nov. 24, 1953 |

FOREIGN PATENTS

| | | |
|---|---|---|
| 532,134 | Germany | Mar. 23, 1930 |